Dec. 2, 1969 S. SCHWEIZERHOF ET AL 3,482,225

FABRICATION OF MAGNETIC DEVICES

Filed July 20, 1966

INVENTORS

Sigfrid Schweizerhof &

Siegfried Schäfer

BY Spencer & Kaye

ATTORNEYS

United States Patent Office 3,482,225

Patented Dec. 2, 1969

3,482,225

FABRICATION OF MAGNETIC DEVICES

Sigfrid Schweizerhof, Backnang, and Siegfried Schäfer, Stuttgart-Zuffenhausen, Germany, assignors to Telefunken Patentverwertungsgesellschaft m.b.H., Ulm (Danube), Germany Filed July 20, 1966, Ser. No. 566,667
Claims priority, application Germany, July 23, 1965, T 29,045
Int. Cl. G11b 5/00
U.S. Cl. 340—174 4 Claims

ABSTRACT OF THE DISCLOSURE

A magnetic information storage element composed of a layer of magnetic storage material completely surrounding an information storage functional area traversed by at least one conductive portion of an insulated conductor circuit, and a layer of a high permeability soft magnetic material disposed partially around each such functional area with at least its edge portions in intimate contact with its associated layer of storage material, the soft-magnetic material layer being in good contact with the layer of information storage material and serving to substantially shorten the effective magnetic path length of the storage layer.

The present invention relates to the fabrication of magnetic devices, and particularly, to magnetic information storage, switching, or logic devices.

Devices of this type find a wide range of applications in many types of systems, such as electronic adding machines, electronic translators, electronic automatic exchange systems, and similar arrangements.

One class of devices of this type employs thin magnetic layers as the information storage medium and are fabricated in accordance with "integrated" techniques in which the individual storage or switching elements are fabricated and assembled together with the required conductive circuits in a single process, thus eliminating the need for individually producing and assembling the individual elements of such a device.

According to one such process, which is described in German Patent No. 1,250,971, a base plate made of insulating material is provided with apertures which define individual strip-like web portions. Wiring is then provided on the base plate in accordance with known printed circuit techniques in such a manner that the conductor portions of the various circuits will be deposited on the web portions. The circuits are then covered with insulating layers and magnetic cores are formed by the galvanization or evaporation of a layer of magnetic material around the web portions.

According to another recently-proposed technique such devices are constructed by providing a plurality of such flat plates having apertures formed therein to define web portions and disposing circuits on both surfaces of each plate, and by then stacking the plates together with their associated web portions in alignment. The resulting structure then has a plurality of composite web portions, with each composite portion being constituted by a plurality of aligned web portions composed of one web portion for each individual plate. According to this process, a layer of magnetic material is then formed around each composite web portion.

In the construction of devices according to the above-described processes, it is desirable to reduce the dimensions of the individual web portions, each of which defines an information storage element, as much as possible in order to achieve a high information bit density and in order to reduce the required operating current levels. However, the degree to which these dimensions can be reduced is limited due to the fact that the ohmic resistance of conductive circuits produced according to the photographic etching or masking techniques would become unacceptedly high if these conductive circuits were to be given too narrow a width.

It is therefore a primary object of the present invention to circumvent this limitation by substantially reducing the amplitudes of the required switching and reading currents for devices of this type without reducing the dimension of its associated conductive circuits.

A more specific object of the present invention is to reduce the required amplitudes of such currents by as much as one half.

A further specific object of the present invention is to reduce the magnetic path length of the magnetic storage layers of such devices.

A still further object of the present invention is to form a magnetic storage layer having a shortened magnetic path length in a rapid and simple manner.

It may be mentioned at this point that it has already been suggested to provide storage devices in which the magnetic circuit of each storage element, or area, consists of a storage portion and a second, soft-magnetic portion provided for shortening the flux path of the element. Devices of this type include specific thin-layer storage devices and so-called "waffle-iron memory" devices, for example. In such devices, the two portions of the magnetic circuit portions are mechanically joined together and are arranged to have demagnetizing air gaps which substantially increase the magnetic path length of the circuit.

It is a further object of the present invention to eliminate these drawbacks by providing a device in which the two portions of the magnetic circuit of each information storage element are intimately joined together in such a manner that no demagnetizing joint is produced, thus eliminating any loss of storage capacity and preventing the occurrence of disturbing instabilities.

These and other objects according to the present invention are achieved by a process for fabricating a magnetic storage, switching or logic device having a flat insulating support body provided with a plurality of apertures to form a plurality of rectangular web portions each of which defines an information storage functional area, and at least one insulated conductor circuit disposed on the body and having conductive portions carried by the web portions. The process according to the present invention is carried out by disposing a layer of magnetic information storage material at least partially around each such functional area, and disposing a layer of high permeability soft magnetic material partially around each such functional area with at least its edge portions in intimate contact with its associated layer of storage material.

The method according to the present invention may be carried out so that the layer of magnetic storage material extends completely around the functional area and the layer of soft magnetic material is disposed on the information storage layer and extends partially around the functional area.

The provision of a layer of soft magnetic material around a portion of the periphery of the functional area has the desirable effect of shortening the effective magnetic path length of the storage layer by an amount proportional to the fraction of the periphery over which the soft magnetic material extends. Thus, if the soft magnetic material layer extends around one half of this periphery, the effective length of the magnetic path is reduced substantially by half, thus reducing by half the amplitude of the current required for switching or reversing the polarization of the magnetic storage layer.

Additional objects and advantages of the present invention will become apparent upon consideration of the following description when taken in conjunction with the accompanying drawings in which.

Figure 1:
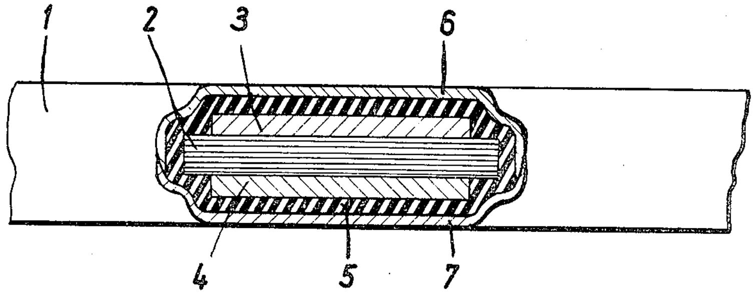
FIGURE 1 is a cross-sectional view of one functional area produced according to the present invention.

Referring first to FIGURE 1, there is shown a portion of a word-organized storage matrix 1 composed of a polyester foil 2 originally provided on each surface with a copper layer. The copper layer on one surface is selectively etched away to form a word line circuit 3, while the copper layer on the other usrface of the foil 2 is similarly selectively etched away to provide a digit and reading line circuit 4. After the circuits and web portions have been formed, the unit is coated with a layer 5 of insulating lacquer to form a plurality of functional areas one of which is shown in cross section in FIGURE 1. The upper side of each such area is then coated with a layer 6 of magnetic information storage material and the lower side thereof is coated with a layer 7 of a high permeability soft magnetic material. Any suitable materials may be used for these layers. Both layers may be deposited, for example, by galvanization or evaporation of suitable magnetic alloys.

As may be seen from FIGURE 1, the two layers are deposited in such a manner that they are in intimate contact, and overlap one another, at their lateral edges so that no demagnetizing joint or air gap exists in the resulting closed magnetic circuit. Such intimate contact is automatically achieved when the layers are deposited in the manner mentioned above.

The information storage layer 6 may be given the desired anisotropy by subjecting it to a suitable auxiliary magnetic field during the deposition process. This auxiliary field may be produced, for example, in a simple manner by feeding auxiliary electric currents through at least one of the conductive circuits 3 and 4 during such process.

Figure 2:
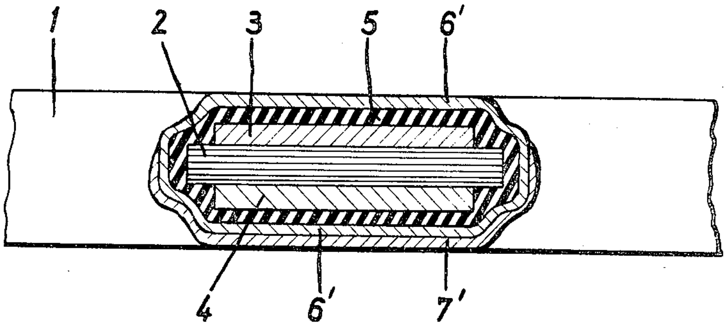
FIGURE 2 is a view similar to that of FIGURE 1 of another form of functional area produced according to the present invention.

Referring now to FIGURE 2, which also shows a portion of a word-organized storage matrix 1, there is shown a modified arrangement produced according to the present invention in which the storage layer 6′ is first deposited completely around the functional area and the lower side of the resulting functional area is then covered with a layer of a suitable soft magnetic material 7′ so as to shorten the resulting magnetic path length in a manner similar to that described above in connection with FIGURE 1. In this embodiment, the entire surface of the soft-magnetic layer 7′ is in intimate contact with the information storage layer 6′.

This arrangement presents the decided advantage that the effect of the soft magnetic layer is practically independent of the information storage layer 6′ upon which it is disposed. Moreover, this form of construction also has the advantage that a particularly favorable contact between the two layers is achieved.

The magnetic layer 6′ of FIGURE 2 may be given the desired anisotropy in a manner similar to that for the arrangement of FIGURE 1 simply by passing suitable auxiliary currents through at least one of the circuits 3 and 4 during the deposition of layer 6′.

It may thus be seen that the present invention provides a method for producing an integrated magnetic information storage matrix, or similar device, in which the magnetic path length of each information storage element is substantially shorter than it would be if each information storage element were covered only with a magnetic information storage layer. Moreover, the method of the present invention results in a device requiring substantially smaller switching currents than prior devices employing only magnetic information storage layers or devices employing combinations of information storage and soft-magnetic layers and incorporating demagnetizing air gaps.

It will be understood that the above description of the present invention is susceptible to various modifications, changes, and adaptations.

What is claimed is:

1. A process for fabricating a magnetic information storage, switching, or logic device starting with a flat insulating support body provided with a plurality of apertures to form a plurality of rectangular web portions each of which defines an information storage functional area, and at least one insulated conductor circuit disposed on the body and having conductor portions carried by the web portions, said process comprising the steps of:

(a) disposing a layer of magnetic information storage material completely around each such functional area; and (b) disposing a layer of a high permeability soft-magnetic material partially around each such functional area so as to cover a portion of its associated layer of storage material, with at least the edge portions of said soft-magnetic material in intimate contact with its associated layer of storage material.

2. A process as defined in claim 1 wherein said step of disposing a layer of soft-magnetic material is carried out by disposing such layer directly on a portion of its associated layer of storage material.

3. A process as defined in claim 1 wherein said step of disposing a layer of soft-magnetic material is carried out by disposing such layer around substantially one half of the periphery of such functional area.

4. In a magnetic information storage, switching, or logic device having a flat insulating support body provided with a plurality of apertures to form a plurality of rectangular web portions each of which defines an information storage functional area, and at least one insulated conductor circuit disposed on said body and having conductive portions carried by said web portions, information storage means comprising:

(a) a layer of magnetic information storage material disposed completely around each such functional area to form a closed magnetic path; and (b) a layer of high permeability soft-magnetic material disposed partially around each such functional area with at least its edge portions in intimate contact with its associated layer of storage material.

References Cited

UNITED STATES PATENTS

| | | | |
|---|---|---|---|
| 2,805,407 | 9/1957 | Wallace | 340—174 |
| 2,911,627 | 11/1959 | Kilburn et al. | 340—174 |
| 3,305,845 | 2/1967 | Grace et al. | 340—174 |
| 3,055,770 | 9/1962 | Sankuer et al. | 340—174 X |
| 3,138,785 | 6/1964 | Chapman et al. | 340—174 |

OTHER REFERENCES

IBM Technical Disclosure Bulletin, "Non-Destructive Readout Magnetic Element," by Spetiotis et al., vol. 6, #6, November 1963, pp. 55, 56.

STANLEY M. URYNOWICZ, Jr., Primary Examiner